No. 765,782. PATENTED JULY 26, 1904.
C. MILLS.
CHAIN MOLDING MACHINE.
APPLICATION FILED APR. 20, 1903.
NO MODEL.
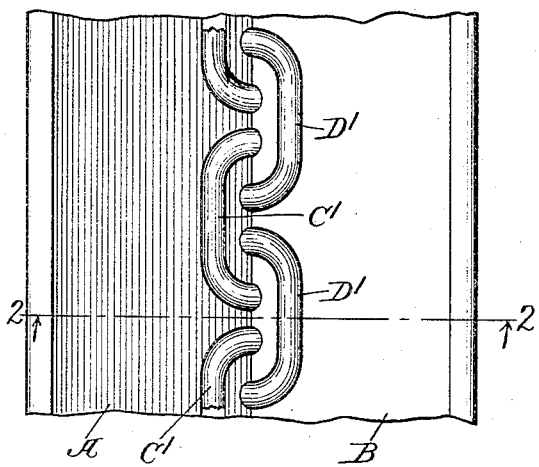
Fig. 1.
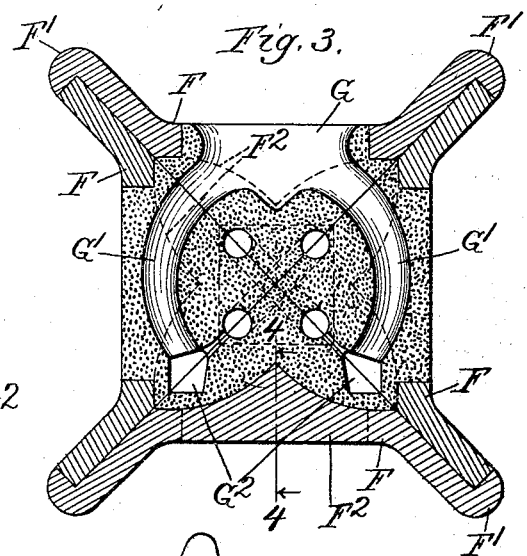
Fig. 3.
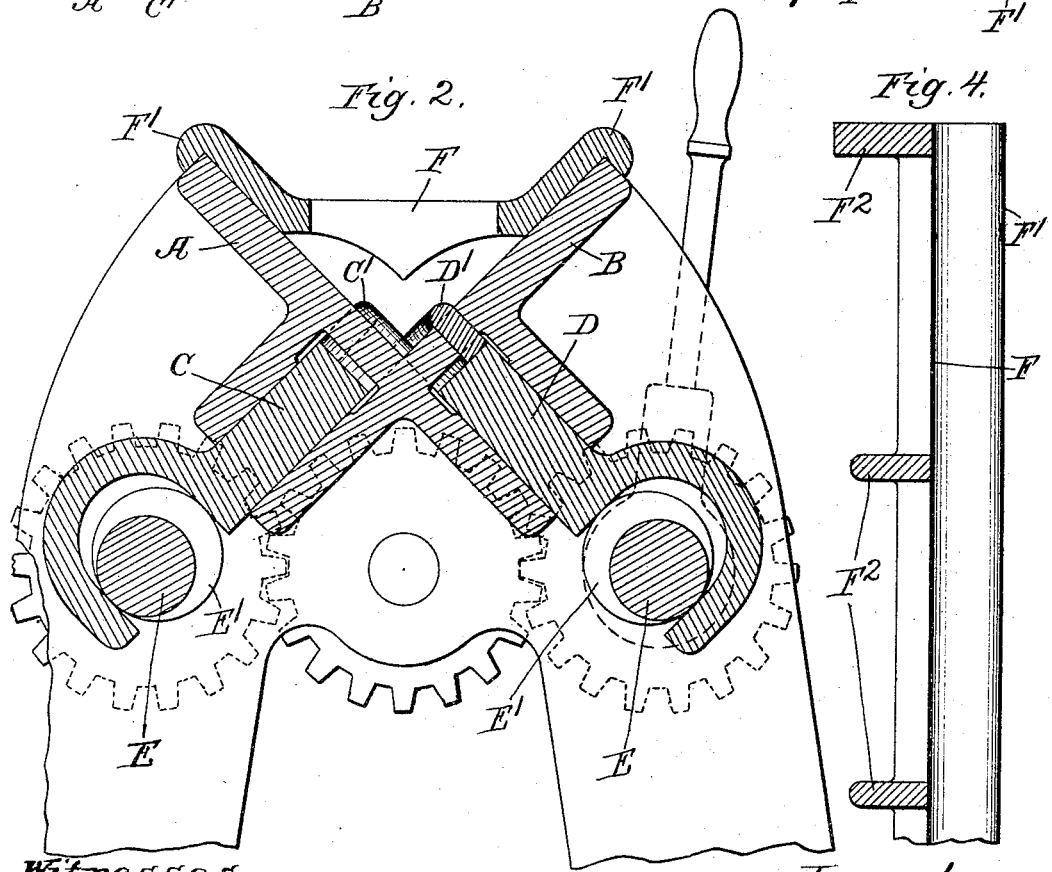
Fig. 2.
Fig. 4.
Witnesses,
Edward T. Wray.
Homer L. Kraft.
Inventor.
Charles Mills
by Parker & Carter
Attorney's.

No. 765,782. Patented July 26, 1904.

UNITED STATES PATENT OFFICE.

CHARLES MILLS, OF NEWTON UPPER FALLS, MASSACHUSETTS, ASSIGNOR TO WILLIS C. SWIFT, OF FITZWILLIAM, NEW HAMPSHIRE.

CHAIN-MOLDING MACHINE.

SPECIFICATION forming part of Letters Patent No. 765,782, dated July 26, 1904.

Application filed April 20, 1903. Serial No. 153,359. (No model.)

*To all whom it may concern:*

Be it known that I, CHARLES MILLS, a citizen of the United States, residing at Newton Upper Falls, in the county of Middlesex and State of Massachusetts, have invented certain new and useful Improvements in Chain-Molding Machines, of which the following is a specification.

My invention relates to devices and machines for forming molds for making chains or link devices of any shape and description and for molding such chains or link devices.

My invention is illustrated in the accompanying drawings, wherein—

Figure 1 is a plan view of one form of mold for carrying out my invention with parts omitted. Fig. 2 is a section on line 2 2, Fig. 1, with parts omitted and showing the flask in position and the supporting-frame. Fig. 3 is a section through the complete mold when ready for use. Fig. 4 is an enlarged section on line 4 4, Fig. 3.

Like letters refer to like parts throughout the several figures.

In view of the fact that chains, for example, are formed of a series of separated endless links linked together into a continuous piece it is exceedingly difficult to make a chain by the process of molding. By means of my present invention this difficulty is overcome and chains may be cheaply and satisfactorily and quickly molded with links of any shape and in sections of any desired length.

Referring now to Figs. 1 and 2, I have shown a machine for this purpose consisting of two inclined plates A and B, which are preferably integral and at right angles to each other, forming what may be termed a "V-shaped trough" of any desired length, the inner surfaces being finished to form the stripping-plate. Associated with the plates A and B are the pattern blocks or supports or the like C and D, which carry the patterns C' D'. These patterns may be of any desired shape, depending upon the shape of the link to be molded, and they pass through openings in the plates A and B (see Fig. 1) and are attached to or connected with the pattern-blocks in any desired manner. These pattern-blocks are provided with suitable means for moving them back and forth to draw the patterns from the sand. Any suitable means for this purpose may be used. As herein illustrated, I have shown shafts E provided with eccentrics E', which engage the pattern-blocks, so that when the shafts are rotated the blocks will be reciprocated. The flask is formed in four sections, one section F being shown in position in Fig. 2. The four sections are applied to the machine separately, adjacent sections being shifted the length of one link, and are thus formed from the same machine and are then brought together to form the complete mold. As before stated, these sections may be of any desired length, and they are provided with bars across their outer faces, and the sand is rammed in between these bars. Two of the flask-sections are preferably provided with lips F', which rest on the edges of the plates A and B when the flask is being rammed, and these lips or flanges engage the edges of the other two sections of the flask when put together, as shown in Fig. 3, thus insuring a proper and fixed relative position of the sections of the mold.

The section through the flask shown in Fig. 3 shows the various sprue-holes through which the metal passes. The metal is poured in at G and then passes along the horn-shaped sprue-holes G' and into the long or longitudinal sprue-holes $G^2$. The sprue-patterns are placed on the plates A and B as required, and the horn sprue-pattern spans or bridges across from one plate to the other, is set in loosely, and is drawn when the flask is lifted from the machine, both ends being of course exposed. The machine may of course be made any desired length.

I have described in detail a simple construction embodying my invention; but it is of course evident that the parts may be varied greatly in form, construction, and arrangement and that some of the parts may be omitted and others used with parts not herein shown without departing from the spirit of my invention. I therefore do not limit myself to the particular construction illustrated.

The use and operation of my invention are as follows: When it is desired to use the machine, one of the sections of the flask is placed in position, as shown in Fig. 2, and the sand is rammed in in the usual manner. The pattern-blocks are then moved so as to withdraw the patterns from the sand. The section of the flask is then removed and another section substituted and the process repeated. After the four sections of the flask have been operated upon these sections are united to form a complete mold, and the metal is poured in the sprue-openings and the section of the chain formed. It will therefore be seen that by means of this invention I am able to form the mold for the chain-links by the same process that molds for ordinary pieces are formed simply by drawing the patterns out of the sand by a small limited angular movement, which may be properly described as a movement of translation leaving the proper impression and that then by combining the sections of the flask a complete mold is produced by means of which a section of chain is molded.

A chain of any desired length may be made by placing the ends of the sections or lengths of chain already cast in the ends of the molds.

I claim—

1. A molding-machine comprising two parts at an angle to each other, each provided with a series of patterns, and openings in the parts through which the patterns may be drawn, the patterns when in their operative position projecting into the space or angle between said parts.

2. A molding-machine comprising two parts having inclined meeting faces, said parts provided with a series of movable patterns projecting through the inclined faces, the ends of the patterns associated with one part overlapping the ends of those associated with the other part when the patterns are in their operative position.

3. A molding-machine comprising two parts having inclined meeting faces which form a V-shaped opening, a series of movable patterns associated with said parts at the point of the V and projecting inwardly when in their operative position, the patterns on one part inclined with relation to the patterns on the other part.

4. A molding-machine comprising two parts at an angle to each other, each provided with a series of patterns, and openings in the parts through which the patterns may be drawn, and a flask having inclined faces adapted to fit between said inclined parts.

5. A molding-machine comprising two faces inclined with relation to each other, two pattern-supporting devices associated with said faces and inclined at an angle to each other and adapted to be moved so that the two patterns will be moved away from each other when being withdrawn from the sand.

6. A molding-machine comprising two stripping-plates at right angles to each other, each provided with a pattern, the two sets of patterns projecting when in their operative position into the angles between the plates and adapted to coact in forming the mold.

7. A molding-machine with a stripping-plate, the two sides of which are preferably at right angles to each other, each provided with a pattern, the two sets of patterns projecting when in their operative position into the angles between the plates and adapted to coact in forming the mold, and means for withdrawing said patterns from the sand.

8. A chain-molding machine comprising two inclined meeting faces, a series of movable link-patterns associated with each inclined face, the ends of the patterns associated with one face overlapping the ends of those associated with the other face when the patterns are in their operative position.

9. A chain-molding machine comprising two inclined meeting faces, a series of link-patterns associated with each inclined face, the ends of the patterns associated with one face overlapping the ends of those associated with the other face when the patterns are in their operative position, and means for laterally moving the link-patterns to and from their operative position.

10. A chain-molding machine comprising a body portion, a series of link-patterns associated therewith, a removable flask associated with said body portion and means for laterally moving said link-patterns to and from their operative position, whereby they are withdrawn from the sand by a motion of translation.

11. A molding-machine comprising two plates at an angle to each other, a series of link-patterns projecting through the faces of said plates, guiding devices at the back of said plates, pattern-supports associated with said guiding devices, and to which the patterns are connected, and means for moving said pattern-supports to withdraw the patterns from the sand.

CHARLES MILLS.

Witnesses:
JOHN S. BLAIR,
WILLIS C. SWIFT.